(12) United States Patent
Nakayama et al.

(10) Patent No.: US 11,786,985 B2
(45) Date of Patent: Oct. 17, 2023

(54) GEAR MACHINING APPARATUS AND GEAR MACHINING METHOD

(71) Applicant: JTEKT CORPORATION, Osaka (JP)

(72) Inventors: Takuya Nakayama, Nagoya (JP); Minoru Sato, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 726 days.

(21) Appl. No.: 16/744,432

(22) Filed: Jan. 16, 2020

(65) Prior Publication Data

US 2020/0230724 A1 Jul. 23, 2020

(30) Foreign Application Priority Data

Jan. 18, 2019 (JP) .................................. 2019-006809

(51) Int. Cl.
*B23Q 3/157* (2006.01)
*B23F 5/16* (2006.01)
(Continued)

(52) U.S. Cl.
CPC ................ *B23F 5/20* (2013.01); *B23F 5/163* (2013.01); *B23F 17/006* (2013.01);
(Continued)

(58) Field of Classification Search
CPC ... Y10T 409/10–109699; Y10T 407/17–1745; Y10T 409/1924;
(Continued)

(56) References Cited

U.S. PATENT DOCUMENTS 3,740,808 A * 6/1973 Shioya .................. B23F 21/166
407/25
5,205,806 A * 4/1993 Ishida .................. B23Q 16/028
483/18
(Continued)

FOREIGN PATENT DOCUMENTS

GB 487760 A * 6/1938
JP 48-86197 A 11/1973
(Continued)

OTHER PUBLICATIONS

Translation of JP 2003-300115A, which JP '115 was published Oct. 2003.*

(Continued)

*Primary Examiner* — Erica E Cadugan
(74) *Attorney, Agent, or Firm* — Oblon, McClelland, Maier & Neustadt, L.L.P.

(57) ABSTRACT

A gear machining apparatus includes a rough working tool having a plurality of replaceable tool blades attached to a tool main body, such that the tool blades are arranged in a circumferential direction of the tool main body and blade tips of the tool blades are oriented outward in a radial direction of the tool main body, a finish working tool having a plurality of tool blades provided to a tool main body in a similar manner to the rough working tool, and machining controllers control to perform rough and finish machinings on the workpiece, such that the working tools are rotated on center lines in axial directions of the working tools, the workpiece is rotated on a center line in axial direction of the workpiece, and the working tools are relatively moved to the workpiece along the center line in the axial direction of the workpiece.

6 Claims, 10 Drawing Sheets

(51) Int. Cl.
*B23F 5/20* (2006.01)
*B23F 17/00* (2006.01)
*B23F 21/12* (2006.01)
*B23F 21/10* (2006.01)

(52) U.S. Cl.
CPC ....... *B23Q 3/15713* (2013.01); *Y10T 29/5114* (2015.01); *Y10T 29/5176* (2015.01); *Y10T 409/105406* (2015.01); *Y10T 409/105565* (2015.01); *Y10T 409/106201* (2015.01); *Y10T 409/108586* (2015.01); *Y10T 409/108904* (2015.01); *Y10T 483/1705* (2015.01); *Y10T 483/1707* (2015.01); *Y10T 483/1736* (2015.01)

(58) Field of Classification Search
CPC .......... Y10T 407/1725; Y10T 407/174; B23Q 3/155–3/15793; B23F 21/128; B23F 21/126; B23F 21/122; B23F 21/146; B23F 21/143; B23F 21/14; B23F 21/106; B23F 21/103; B23F 21/10; B23F 21/166; B23F 21/163; B23C 5/109; B23C 2200/0433; B23C 2200/0477; B23C 2200/0455
USPC .................. 409/1–62; 407/20–29, 42, 25, 28
See application file for complete search history.

(56) References Cited

U.S. PATENT DOCUMENTS

| | | | |
|---|---|---|---|
| 2011/0150582 A1* | 6/2011 | Sjoo | ......................... B23C 5/06 407/42 |
| 2012/0207553 A1* | 8/2012 | Sjoo | ...................... B23F 21/166 407/25 |
| 2012/0282055 A1 | 11/2012 | Marx et al. | |
| 2014/0079498 A1 | 3/2014 | Vogel | |
| 2014/0105698 A1 | 4/2014 | Vogel | |
| 2015/0063927 A1 | 3/2015 | Sjoo | |
| 2015/0158100 A1 | 6/2015 | Vogel | |
| 2016/0008900 A1 | 1/2016 | Sjoo | |
| 2016/0175950 A1 | 6/2016 | Stadtfeld et al. | |
| 2017/0014922 A1 | 1/2017 | Ellicott | |
| 2017/0182573 A1* | 6/2017 | Shinjo | ...................... B23C 5/202 |
| 2018/0354047 A1 | 12/2018 | Sato et al. | |
| 2020/0189015 A1* | 6/2020 | Nakayama | .............. B23F 5/163 |

FOREIGN PATENT DOCUMENTS

| | | | | |
|---|---|---|---|---|
| JP | 2000-141129 | A | * | 5/2000 |
| JP | 2003-300115 | A | * | 10/2003 |
| JP | 2012-171020 | A | | 9/2012 |
| JP | 2013-146790 | A | | 8/2013 |
| JP | 2014-516807 | A | | 7/2014 |
| JP | 2015-44282 | A | | 3/2015 |
| JP | 2016-16514 | A | | 2/2016 |
| JP | 2016-529128 | A | | 9/2016 |
| JP | 2018-202565 | A | | 12/2018 |

OTHER PUBLICATIONS

Office Action dated Nov. 29, 2022, in corresponding Japanese Patent Application No. 2019-006809 (with English Translation), 15 pages.

* cited by examiner

Gear Having Teeth In Which A Finished Shape of a Tooth Surface of the Gear Tooth Includes an Involute Shape

Figure 11

Replaceable Tool Blade Formed In a Shape of an Equilateral Triangle

Figure 12

GEAR MACHINING APPARATUS AND GEAR MACHINING METHOD

CROSS-REFERENCE TO RELATED APPLICATIONS

This application is based on and claims priority under 35 USC 119 from Japanese Patent Application No. 2019-006809 filed on Jan. 18, 2019, the contents of which are incorporated herein by reference.

TECHNICAL FIELD

The present disclosure relates to a gear machining apparatus and a gear machining method.

BACKGROUND ART

In recent years, gear machining capable of high-speed working has come to be desired from the viewpoint of cost reduction. Skiving as described in JP2012-171020A is one example. In skiving, a gear cutting tool and a workpiece are set in such a manner that their axial lines cross each other (i.e., they have a crossing angle which is a term used in gear machining). The gear cutting tool is moved relative to the workpiece parallel with the axial line of the workpiece while they are rotated synchronously about their respective axial lines.

The gear cutting tool for skiving machining performs a pass, by relatively moving the gear cutting tool to the workpiece as described above, a plurality of times, and since the edge of the tool blade performs machining in all the passes, wear amount of the edge increases. As a measure thereagainst, tool replacement is performed when the wear amount of the blade edge of the gear cutting tool exceeds a limit; however, this increases the machining cost because the gear cutting tool which is generally made of a solid high-speed tool steel is very high in cost. Accordingly, JP2015-44282A and JP2016-16514A describe gear cutting tools that enable replacement of only the tool blade. According to this, since the cost of tool replacement is eliminated and the cost of only tool blade replacement is required, increase in the machining cost can be suppressed.

With the gear cutting tools described in the above-mentioned JP2015-44282A and JP2016-16514A, for example, when an external gear having an involute tooth shape is formed, a dedicated tool blade formed in the involute shape is necessary. With this gear cutting tool, since a dedicated tool blade is used that is formed so that only one end side is capable of machining, the number of times of replacement of the dedicated tool blade increases, and since it is necessary to form the dedicated tool blade in the involute shape, the manufacture of the dedicated tool blade is difficult, so that the machining cost tends to increase.

SUMMARY OF INVENTION

The present disclosure provides a gear machining apparatus and a gear machining method capable of low-cost gear machining.

According to an aspect of the present invention, a gear machining apparatus configured to generate a gear tooth to a workpiece includes a rough working tool having a cylindrical tool main body, and a plurality of replaceable tool blades formed in a shape that is not based on a finished shape of a tooth surface of the gear tooth and attached to the tool main body, such that the tool blades are arranged in a circumferential direction of the tool main body and a blade tip of each of the tool blades is oriented outward in a radial direction of the tool main body; a finish working tool having a cylindrical tool main body, and a plurality of tool blades provided to the tool main body, such that the tool blades are arranged in the circumferential direction of the tool main body and a blade tip of each of the tool blades are oriented outward in the radial direction of the tool main body; a tool spindle which rotatably supports each of the rough working tool and the finish working tool; a workpiece spindle which rotatably supports the workpiece and is relatively movable to the tool spindle; a tool magazine which is capable of housing the rough working tool and the finish working tool; a tool changer which is configured to replace the rough working tool and the finish working tool with respect to the tool spindle; a rough machining controller which is configured to control to perform a rough machining on the workpiece, such that the rough working tool is rotated on a center line in an axial direction of the rough working tool, the workpiece is rotated on a center line in axial direction of the workpiece, and the rough working tool is relatively moved to the workpiece along the center line in the axial direction of the workpiece; and a finish machining controller which is configured to control to perform a finish machining on the workpiece, such that the finish working tool is rotated on a center line in an axial direction of the finish working tool, the workpiece is rotated on the center line in the axial direction of the workpiece, and the finish working tool is relatively moved to the workpiece along the center line in the axial direction of the workpiece.

According to another aspect of the present invention, a gear machining method of generating a gear tooth to a workpiece includes performing a rough machining on the workpiece, by rotating a rough working tool on a center line in an axial direction of the rough working tool, rotating the workpiece on a center line in an axial direction of the workpiece, and relatively moving the rough working tool to the workpiece along the center line in the axial direction of the workpiece, the rough working tool having a cylindrical tool main body and a plurality of replaceable tool blades formed in a shape that is not based on a finished shape of a tooth surface of the gear tooth and attached to the tool main body, such that the tool blades are arranged in a circumferential direction of the tool main body and a blade tip of each of the tool blades is oriented outward in an axial direction of the tool main body; and performing a finish machining on the workpiece such that the gear tooth is generated, by rotating a finish working tool on a center line in an axial direction of the finish working tool, rotating the workpiece on the center line in the axial direction of the workpiece, and relatively moving the finish working tool to the workpiece along the center line in the axial direction of the workpiece, after replacing the rough working tool with a finish working tool, the finish working tool having a cylindrical tool main body and a plurality of tool blades that are provided to the tool main body, such that the tool blades are arranged in a circumferential direction of the tool main body and a blade tip of each of the tool blades is oriented outward in the radial direction of the tool main body.

According to the aspect of the present invention, since replaceable tool blades are used that are formed in a shape not based on the shape of the teeth surface of the gear teeth generated on the workpiece, the tool blades can be formed in a simple shape compared with the tool blade formed in a shape based on the shape of the teeth surface of the gear teeth generated on the workpiece, so that the cost can be suppressed. Further, since the cost of tool replacement is eliminated and the cost of only tool blade replacement is required, the gear machining cost can be reduced.

BRIEF DESCRIPTION OF DRAWINGS

FIG. 11 is a schematic view of a gear manufactured with the gear cutting apparatus of the present disclosure.

FIG. 12 schematically depicts an alternative configuration of the blade shape.

DESCRIPTION OF EMBODIMENTS (1. Shape of Gear Cutting Tool)

A gear cutting tool using for the gear machining apparatus according to an embodiment of the present disclosure is a tool blades replaceable external gear type tool for generating a gear such as a spur gear or a helical gear by machining a workpiece with skiving. As described above in the related art, conventional replacement type tool blades for skiving are specially manufactured, dedicated inserts rather than common, general-purpose inserts. Where, for example, the finished shape of the tooth surface of each gear tooth to be generated is an involute shape, the shape of the blade surface of the dedicated inserts needs to be an involute shape, too, and hence the dedicated inserts are very expensive.

On the other hand, general-purpose inserts are replacement-type lathe-cutting tool blades (lathe-cutting inserts, tips, or throw away inserts) that are used in a cutting tool for lathe-cutting a workpiece. Whereas general-purpose inserts have a triangular blade surface shape and are inexpensive, they cannot generate an involute-shaped tooth shape. Thus, in skiving using the gear-cutting tool according to the embodiment, rough machining for gear teeth formation is performed using general-purpose inserts and a final, involute-shaped tooth shape (see FIG. 11) is formed thereafter by performing finish machining for gear teeth formation using dedicated inserts. This procedure makes it possible to decrease the frequency of working using the expensive, dedicated inserts and thereby lower the working cost.

The shape of the gear cutting tool according to the embodiment will be hereinafter described with reference to the drawings. As described later in detail, the gear cutting tool according to the embodiment includes three kinds of cutting tools having the same basic shape (i.e., first rough working tool, second rough working tool, and first finish working tool). Thus, symbols "A," "B," and "C" used in FIGS. 1A and 1B correspond to a first rough working tool 1A, a second rough working tool 1B, and a first finish working tool 1C, respectively.

Figure 1A:
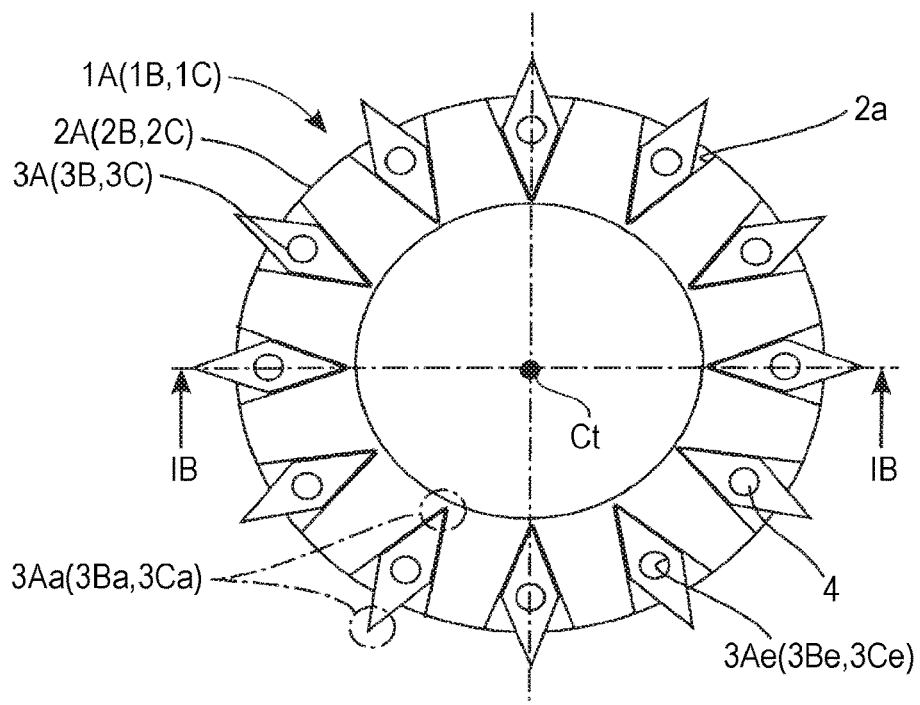
FIG. 1A is a view, as viewed along its axial line, of a gear cutting tool according to an embodiment of the present disclosure.
Figure 1B:
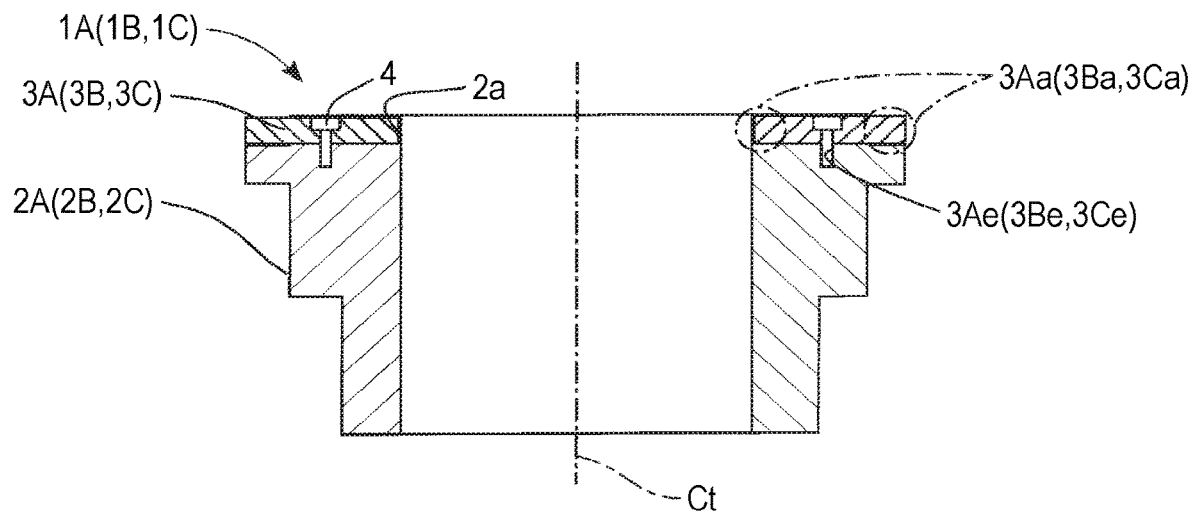
FIG. 1B is a view, as viewed from a direction IB, of the gear cutting tool shown in FIG. 1A.

As shown in FIGS. 1A and 1B, the gear cutting tool 1A (1B, 1C) is equipped with a cylindrical tool main body 2A (2B, 2C) and a plurality of (in this example, 12) replaceable tool blades 3A (3B, 3C) that are attached to the tool main body 2A (2B, 2C) in such a manner that they are arranged in the circumferential direction and one-end-side blade tips 3Aa (3Ba, 3Ca) are directed to the outside. One end surface of the tool main body 2A (2B, 2C) of the gear cutting tool 1A (1B, 1C) is formed with triangular-prism-shaped grooves 2a which are fitted with quadrilateral-prism-shaped (rhombic-prism-shaped) tool blades 3A (3B, 3C) at intervals of the same angle (in this example, 30°).

Each groove 2a is formed so that when the other-end-side blade tip 3Aa (3Ba, 3Ca) of a tool blade 3A (3B, 3C) is fitted into it to establish a close contact, its one-end-side blade tip 3Aa (3Ba, 3Ca) projects beyond the inner circumferential surface of the tool main body 2A (2B, 2C) and the tool blade 3A (3B, 3C) is thereby positioned with high accuracy. The tool blade 3A (3B, 3C) that is fitted in the groove 2a is fastened and fixed by a bolt 4 that is inserted into a bolt hole 3Ae (3Be, 3Ce).

The first rough working tool 1A is equipped with a first rough working tool main body 2A and first rough working tool blades 3A. The second rough working tool 1B is equipped with a second rough working tool main body 2B and second rough working tool blades 3B. The first finish working tool 1C is equipped with a first finish working tool main body 2C and first finish working tool blades 3C. The first rough working tool blades 3A and the second rough working tool blades 3B are tool blades for rough working and are general-purpose inserts. The first finish working tool blades 3C are tool blades for finish machining and are dedicated inserts.

Figure 2A:
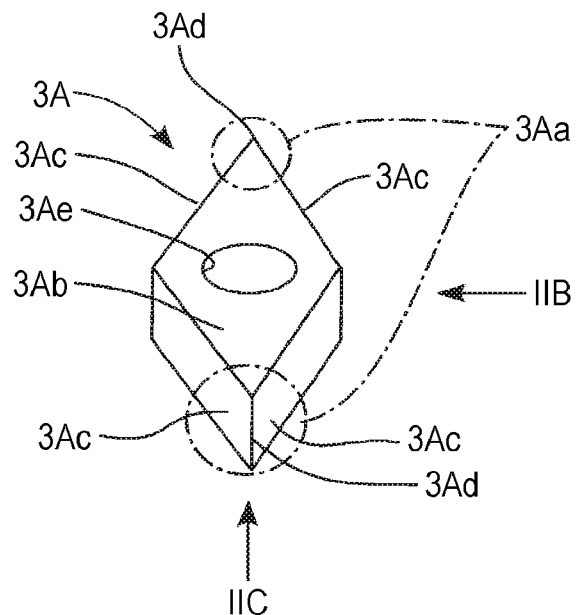
FIG. 2A is a perspective view of a first rough working tool blade of a first rough working tool of the gear cutting tool.
Figure 2B:
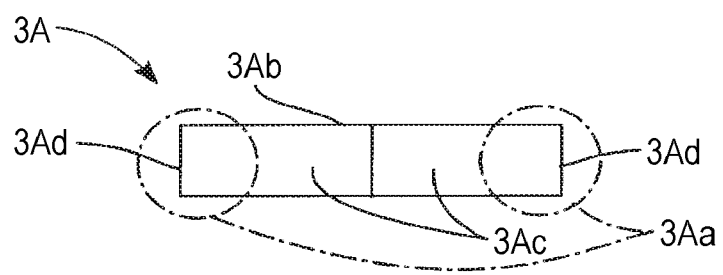
FIG. 2B is a view, as viewed from a direction IIB, of the first rough working tool blade shown in FIG. 2A.
Figure 2C:
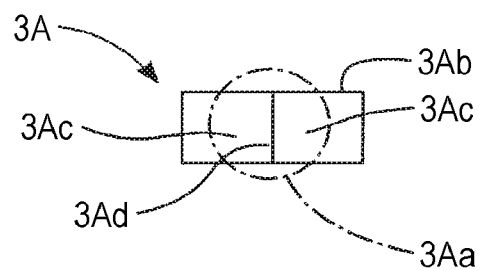
FIG. 2C is a view, as viewed from a direction IIC, of the first rough working tool blade shown in FIG. 2A.

Each first rough working tool blade 3A has a shape that is not based on the shape of the tooth surface of each gear tooth to be generated in a workpiece and does not have clearance angle. That is, where the finished shape of the tooth surface of each gear tooth of to be generated is an involute shape, the "shape that is not based on the shape of the tooth surface of each gear tooth" is a shape that cannot generate an involute shape by skiving. More specifically, as shown in FIGS. 2A-2C, each first rough working tool blade 3A is shaped like a quadrilateral prism (rhombic prism) and its two end portions having an acute angle (e.g., 30°) serve as blade tips 3Aa. Each blade tip 3Aa does not have a front clearance angle or side clearance angles.

That is, a ridge line 3Ad between two clearance surfaces 3Ac of each blade tip 3Aa is perpendicular to a top rake surface 3Ab of the blade tip 3Aa (i.e., the angle (front clearance angle) formed by the ridge line 3Ad and the plane perpendicular to the rake surface 3Ab and passing through its apex is 0°) and the clearance surfaces 3Ac on both sides of the rake surface 3Ab form 90° with the rake surface 3Ab (i.e., the angle (side clearance angles) formed by each clearance surface 3Ac and the plane perpendicular to the rake surface 3Ab and including the boundary edge is 0°). A bolt hole 3Ae to be used for attaching the first rough working tool blade 3A to the first rough working tool main body 2A penetrates through the first rough working tool main blade 3A so as to have an opening at the center of the rake surface 3Ab.

Figure 3A:
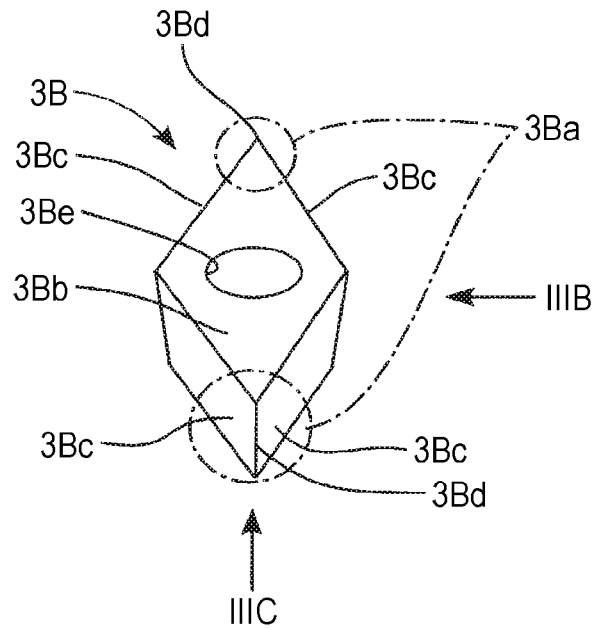
FIG. 3A is a perspective view of a second rough working tool blade of a second rough working tool of the gear cutting tool.
Figure 3B:
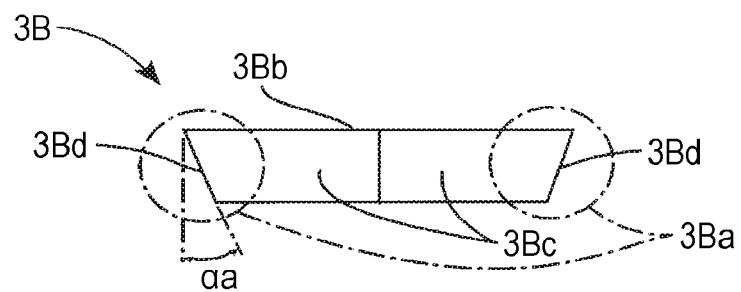
FIG. 3B is a view, as viewed from a direction IIIB, of the second rough working tool blade shown in FIG. 3A.
Figure 3C:
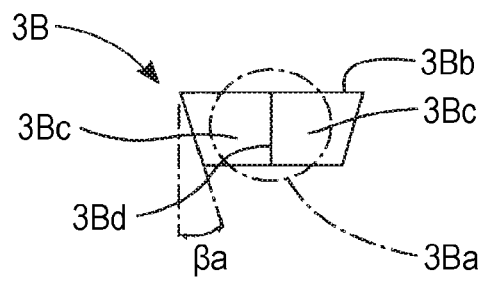
FIG. 3C is a view, as viewed from a direction IIIC, of the second rough working tool blade shown in FIG. 3A.

Each second rough working tool blade 3B has a shape that is not based on the shape of the tooth surface of each gear tooth to be generated in the workpiece and has clearance angle. More specifically, as shown in FIGS. 3A-3C, each second rough working tool blade 3B is shaped like a quadrilateral prism (rhombic prism) and its two end portions (acute angle portions) having an acute angle (e.g., 30°) serve as blade tips 3Ba. Each blade tip 3Ba has a front clearance angle or side clearance angles.

That is, the angle (front clearance angle) formed by a ridge line 3Bd between two clearance surfaces 3Bc of each blade tip 3Ba and the plane perpendicular to the top rake surface 3Bb of the blade tip 3Ba and passing through its apex is $\alpha a°$ and the angle (side clearance angles) formed by each clearance surface 3Bc and the plane perpendicular to the rake surface 3Bb and including the boundary edge is $\beta a°$. A bolt hole 3Be to be used for attaching the second rough working tool blade 3B to the second rough working tool main body 2B penetrates through the second rough working tool main blade 3B so as to have an opening at the center of the rake surface 3Bb.

Figure 4A:
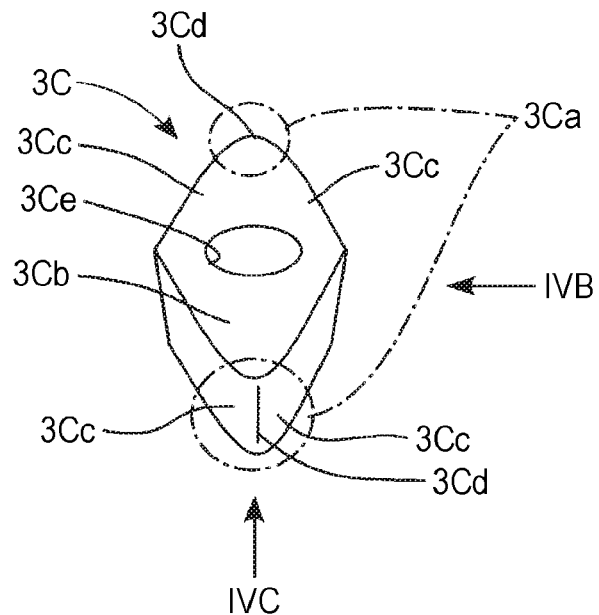
FIG. 4A is a perspective view of a first finish working tool blade of a first finish working tool of the gear cutting tool.
Figure 4B:
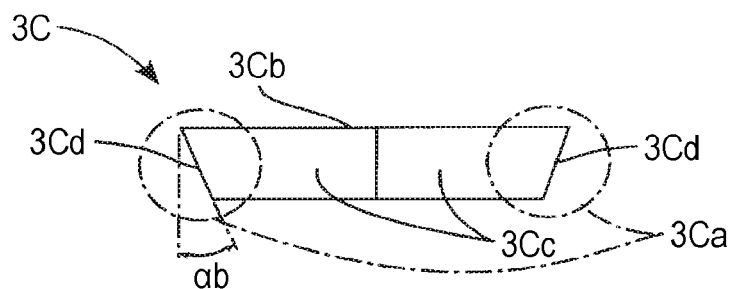
FIG. 4B is a view, as viewed from a direction IVB, of the first finish working tool blade shown in FIG. 4A.
Figure 4C:
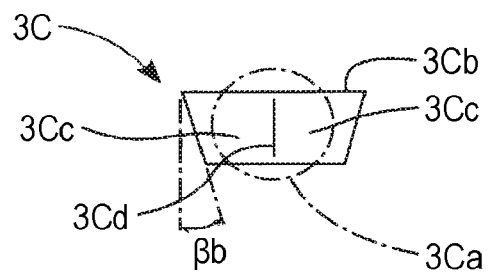
FIG. 4C is a view, as viewed from a direction IVC, of the first finish working tool blade shown in FIG. 4A.

Each first finish working tool blade 3C has a shape that is based on the shape of the tooth surface of each gear tooth to be generated in the workpiece and has clearance angle. That is, where the finished shape of the tooth surface of each gear tooth of to be generated is an involute shape, the "shape that is based on the shape of the tooth surface of each gear tooth" is a shape that can generate an involute shape by skiving. More specifically, if the shape of the tooth surface of each gear tooth to be generated in the workpiece is, for example, an involute shape, as shown in FIGS. 4A-4C each first finish working tool blade 3C is formed into a similar involute shape and its two end portions having an acute angle serve as blade tips 3Ca. Each first finish working tool blade 3C is the same as each second rough working tool blade 3B in that a front clearance angle ($\alpha b°$) and side clearance angles ($\beta b°$) are formed and that a bolt hole 3Ce to be used for attaching the first finish working tool blade 3C to the first finish working tool main body 2C penetrates through the first finish working tool blade 3C so as to have an opening at the center of a rake surface 3Cb of the first finish working tool blade 3C.

Figure 5:
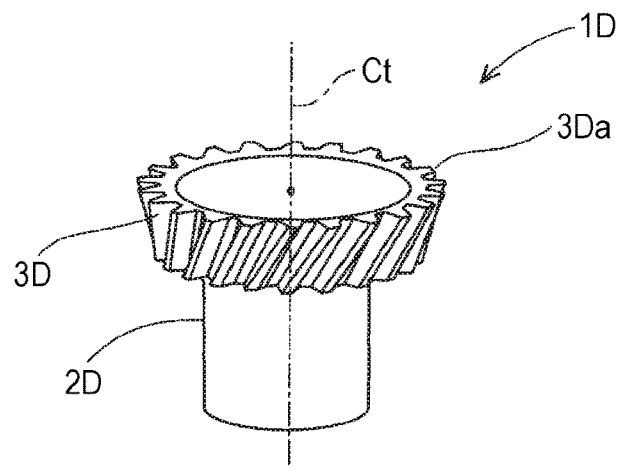
FIG. 5 is a perspective view of a second finish working tool as the gear cutting tool.

An external gear type second finish working tool 1D for finish machining shown in FIG. 5 which is made of a solid material can be used as another gear cutting tool in addition to the tool blades replacement type, external gear type tools described above (first rough working tool 1A, second rough working tool 1B, and first finish working tool 1C). The second finish working tool 1D has a plurality of second finish working tool blades 3D that are unitized with a cylindrical second finish working tool main body 2D in such a manner that their blade tips 3Da are located on the side of the outer circumference of the second finish working tool main body 2D and directed to the outside. Like each first finish working tool blade 3C shown in FIGS. 3A-3C, each second finish working tool blade 3D has a shape that is based on the shape of the tooth surface of each gear tooth to be generated in the workpiece and has clearance angles.

As described above, since the first rough working tool 1A, the second rough working tool 1B, the first finish working tool 1C and the second finish working tool 1D are working tool with the replaceable tool blades, the cost can be suppressed to the cost of only tool blade replacement instead of the cost of tool replacement required in the case of a gear cutting tool made of a solid high-speed tool steel. Moreover, since the first rough working tool 1A and the second rough working tool 1B use all-purpose tool blades (the tool blades of the first rough working tool 3A and the tool blades of the second rough working tool 3B), they are low in cost compared with the dedicated tool blade (the tool blades of the first finish working tool 3C) of the first finish working tool 1C, so that the machining cost can be reduced.

Each first rough working tool blade 3A assumes a quadrilateral prism shape (rhombic prism shape). The two acute-angled end portions serve as the blade tips 3Aa and each blade tip 3Aa is formed by the two clearance surfaces 3Ac. Thus, in each first rough working tool blade 3A, cutting blades formed on the two respective sides of each of the two blade tips 3Aa (four cutting blades in total) can be used as working execution portions. In other words, the lathe-cutting insert has an angled portion which is cutting part of the lathe-cutting insert. As a result, the working cost can be made lower through reduction of the frequency of replacement of tool blades than in a working tool blade having only two working execution portions like the conventional replacement type tool blade for skiving described in the related art. The same is true of the second rough working tool 1B and the first finish working tool 1C.

Although each first rough working tool blade 3A assumes a quadrilateral prism shape (rhombic prism shape) and has four working execution portions, each first rough working tool blade may be shaped like a prism that assumes a regular triangle in cross section (it has six working execution portions in total). This working tool can lower the working cost through reduction of the frequency of replacement of tool blades. The same is true of the second rough working tool 1B and first finish working tool 1C.

Since the first rough working tool 1A and the second rough working tool 1B are used only for rough machining that need not be high accuracy working, the accuracy of attachment at the time of replacement of the first rough working tool blades 3A or the second rough working tool blades 3B need not be high and hence work of replacing them can be performed in a shorter time. On the other hand, since the first finish working tool 1C and the second finish working tool 1D are used only for finish machining that should be high accuracy working, the working load can be lowered by decreasing the number of working paths when generating the gear teeth. As a result, the manufacturing cost can be lowered through reduction of the degrees of wear of the first finish working tool blades 3C and the second finish working tool blades 3D and resulting reduction of the frequency of replacement of tools.

(2. Configuration of Gear Machining Apparatus 10)

Figure 6:
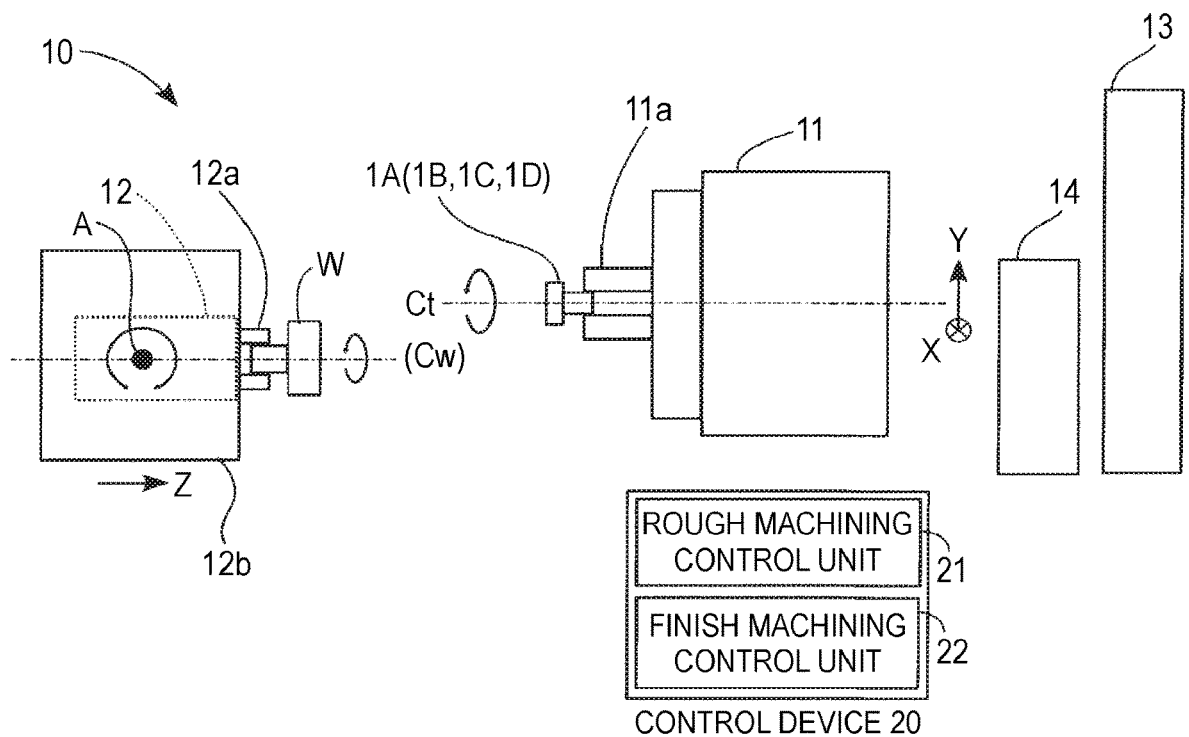
FIG. 6 shows a rough configuration of a gear machining apparatus according to the embodiment of the present disclosure.

The configuration of a gear machining apparatus 10 according to the embodiment of the present disclosure will be described with reference to FIG. 6. As shown in FIG. 6, for example, the gear machining apparatus 10 is a 5-axis machining center that enables movement in each of three orthogonal axes (X axis, Y axis, and Z axis), rotation about a C axis (axial line Cw of a workpiece W), and a swing about an A axis. The gear machining apparatus 10 is equipped with the first rough working tool 1A or the second rough working tool 1B and the first finish working tool 1C or the second finish working tool 1D, a tool spindle 11 capable of rotating while supporting the first rough working tool 1A, the second rough working tool 1B, the first finish working tool 1C, or the second finish working tool 1D, a workpiece spindle 12 capable of rotating while supporting the workpiece W and capable of moving relative to the tool spindle 11, a tool magazine 13 capable of housing the first rough working tool 1A or the second rough working tool 1B and the first finish working tool 1C or the second finish working tool 1D, a tool switching device 14 for switching the tool attached to the tool spindle 11 between the first rough working tool 1A or the second rough working tool 1B and the first finish working tool 1C or the second finish working tool 1D, a control device 20 for controlling an operation of generating the gear teeth, or the like.

The tool spindle 11 which is disposed on a bed (not shown) supports, via a chuck 11a, the first rough working tool 1A, the second rough working tool 1B, the first finish working tool 1C, or the second finish working tool 1D in such a manner that it can rotate about the axial line Ct of the gear cutting tool 1. Furthermore, the tool spindle 11 can move in the X-axis direction and the Y-axis direction over the bed. Thus, the first rough working tool 1A, the second rough working tool 1B, the first finish working tool 1C, or the second finish working tool 1D can rotate about its axial line Ct and move in the X-axis direction and the Y-axis direction relative to the bed.

The workpiece spindle 12 which is disposed over the bed supports, via a chuck 12a, the workpiece W in such a manner that the workpiece W can rotate about the C axis, that is, the axial line Cw of the workpiece W. The workpiece spindle 12 is supported by a tilt table 12b (which is disposed on the bed) so as to be swingable (tiltable) about the A axis. The workpiece spindle 12 which is supported by the tilt table 12b can move in the Z-axis direction over the bed. As a result, the workpiece W can rotate about its axial line Cw, swing about the A axis relative to the bed, and move in the Z-axis direction.

Although the statement was made above to the effect that the tool magazine 13 houses the first rough working tool 1A or the second rough working tool 1B as a rough working tool and houses the first finish working tool 1C or the second finish working tool 1D as a finish working tool, the tool magazine 13 may be such as to house all of the first rough working tool 1A, the second rough working tool 1B, the first finish working tool 1C, and the second finish working tool 1D The control device 20 is equipped with a rough machining controller 21 for controlling rough machining on the workpiece W by the first rough working tool 1A or the second rough working tool 1B and a finish machining controller 22 for controlling finish machining on the workpiece W by the first finish working tool 1C or the second finish working tool 1D. The control device 20 moves the first rough working tool 1A, the second rough working tool 1B, the first finish working tool 1C, or the second finish working tool 1D being supported by the tool spindle 11 in each of the X-axis direction and the Y-axis direction by drive-controlling screw mechanisms and drive motors (not shown) for moving the tool spindle 11 and moves the workpiece W being supported by the workpiece spindle 12 in the Z-axis direction by drive-controlling a screw mechanism and a drive motor (not shown) for moving the workpiece spindle 12.

Figure 8A:
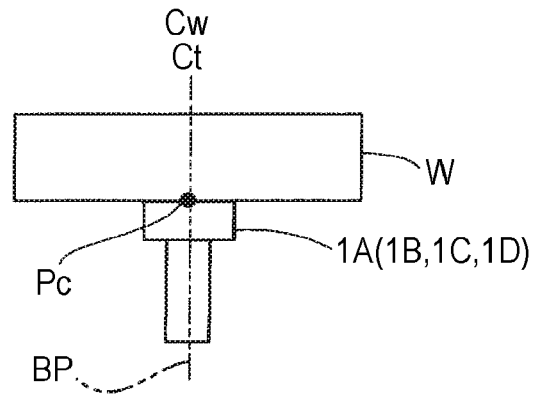
FIG. 8A is a view, as viewed from a radial direction of a gear cutting tool, of an arrangement state before a crossing angle is formed that is necessary when a workpiece is machined with the gear cutting tool.
Figure 8B:
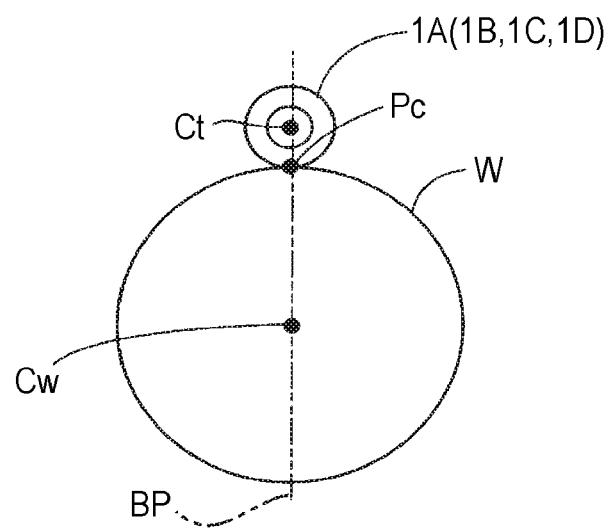
FIG. 8B is a view, as viewed along the axial-line direction of the gear cutting tool, of the arrangement state of FIG. 8A.

As shown in FIGS. 8A and 8B, the control device 20 sets the axial line Ct of the first rough working tool 1A, the second rough working tool 1B, the first finish working tool 1C, or the second finish working tool 1D being supported by the tool spindle 11 and the axial line Cw of the workpiece W being supported by the workpiece spindle 12 parallel with each other (reference state). The plane that includes the axial lines Ct and Cw is defined as a reference plane BP.

Figure 9A:
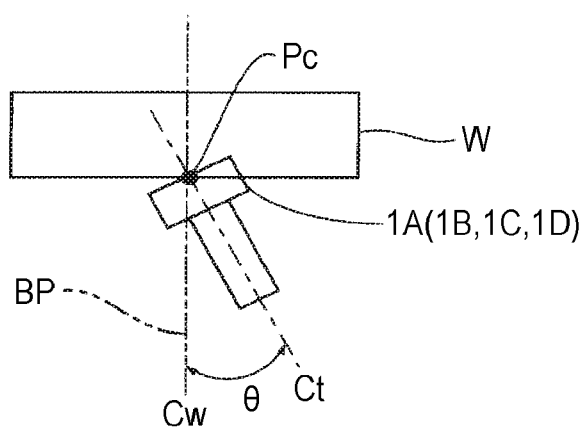
FIG. 9A is a view, as viewed from the radial direction of the gear cutting tool, of an arrangement state after the crossing angle is formed that is necessary when the workpiece is machined with the gear cutting tool.
Figure 9B:
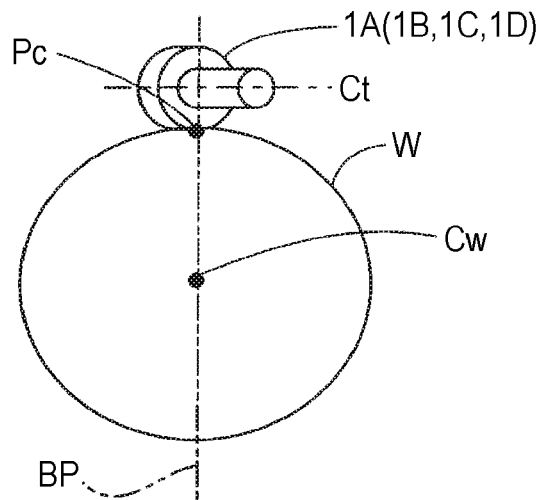
FIG. 9B is a view, as viewed along the axial-line direction of the workpiece, of the arrangement state of FIG. 9A.

Furthermore, the control device 20 swings the workpiece W being supported by the tilt table 12b about the A axis by drive-controlling a drive motor for the tilt table 12b. As shown in FIGS. 9A and 9B, the control device 20 disposes the first rough working tool 1A, the second rough working tool 1B, the first finish working tool 1C, or the second finish working tool 1D at a position (intersecting position) which incline the axial line Ct of the first rough working tool 1A, the second rough working tool 1B, the first finish working tool 1C, or the second finish working tool 1D being supported by the tool spindle 11 from the reference plane BP toward the direction perpendicular to it by a crossing angle θ. The crossing angle θ is adjusted on the basis of a twist angle of teeth of a gear to be generated in the workpiece W and a twist angle of the first rough working tool 1A, the second rough working tool 1B, the first finish working tool 1C, or the second finish working tool 1D.

Figure 10A:
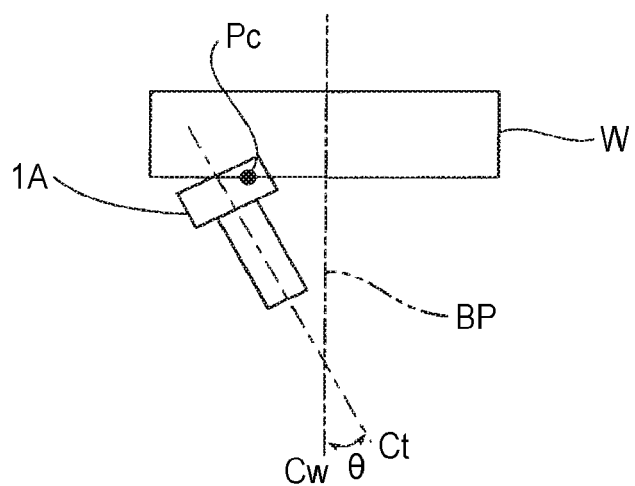
FIG. 10A is a view, as viewed from the radial direction of the gear cutting tool, of an arrangement state after an offset angle is formed that is necessary when the workpiece is machined with the gear cutting tool in a case that the gear cutting tool does not have a clearance angle.
Figure 10B:
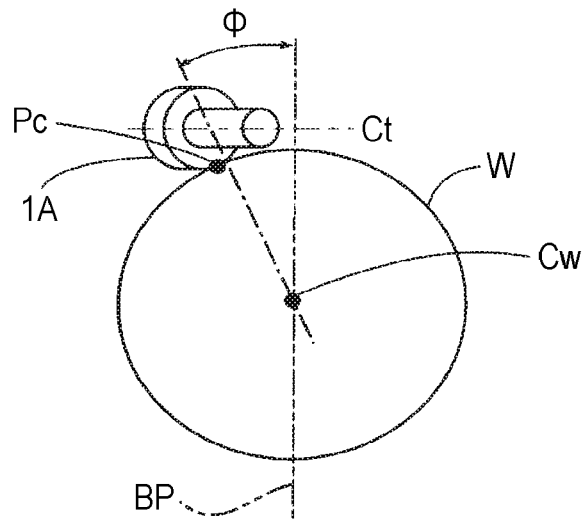
FIG. 10B is a view, as viewed along the axial-line direction of the workpiece, of the arrangement state of FIG. 10A.

When the first rough working tool 1A is supported by the tool spindle 11, as shown in FIGS. 10A and 10B the control device 20 sets a machining point Pc of the first rough working tool 1A and the workpiece W to a position (offset position) that is deviated from a reference position in the reference plane BP by an offset angle ϕ in the circumferential direction of the workpiece W. The control for positioning the first rough working tool 1A so that the machining point Pc is located at the offset position is a common control that is performed to secure a clearance angle in the case where no clearance angle are formed as in the first rough working tool blades 3A of the first rough working tool 1A. Even with the second rough working tool 1B, the first finish working tool 1C, or the second finish working tool 1D having the clearance angles, the second rough working tool 1B, the first finish working tool 1C, or the second finish working tool 1D is positioned so that a machining point Pc is located at an offset position having a prescribed offset angle if a further prescribed clearance angle is necessary.

Still further, the control device 20 rotates the first rough working tool 1A, the second rough working tool 1B, the first finish working tool 1C, or the second finish working tool 1D being supported by the tool spindle 11 about the axial line Ct by drive-controlling a drive motor for rotating the tool spindle 11. And the control device 20 rotates the workpiece W being supported by the workpiece spindle 12 about the axial line Cw by driving a drive motor for rotating the workpiece spindle 12. Furthermore, the control device 20 controls rough machining or finish machining on the workpiece W by moving the first rough working tool 1A, the second rough working tool 1B, the first finish working tool 1C, or the second finish working tool 1D being supported by the tool spindle 11 in the axial line Cw direction of the workpiece W being supported by the workpiece spindle 12 by drive-controlling the screw mechanisms and the drive motors for moving the tool spindle 11 and the workpiece spindle 12.

(3. Operation of Control Device 20 of Gear Machining Apparatus 10)

Next, how the control device 20 of the gear machining apparatus 10 operates (gear machining method) will be described with reference to FIG. 7. It is assumed that the first rough working tool 1A is attached to the tool spindle 11 and the first finish working tool 1C is housed in the tool magazine 13. It is also assumed that a workpiece W that is composed of a large-diameter cylindrical member and a small-diameter cylindrical member that is concentric with and is unitized with the large-diameter cylindrical member is supported by the workpiece spindle 12 and that the gear machining apparatus 10 is to generate teeth of a gear in the outer circumferential surface of the large-diameter cylindrical member of the workpiece W by means of the first rough working tool 1A and the first finish working tool 1C. The control device 20 executes the process shown in FIG. 7 also in the case of using the second rough working tool 1B instead of the first rough working tool 1A or using the second finish working tool 1D instead of the first finish working tool 1C.

Figure 7:
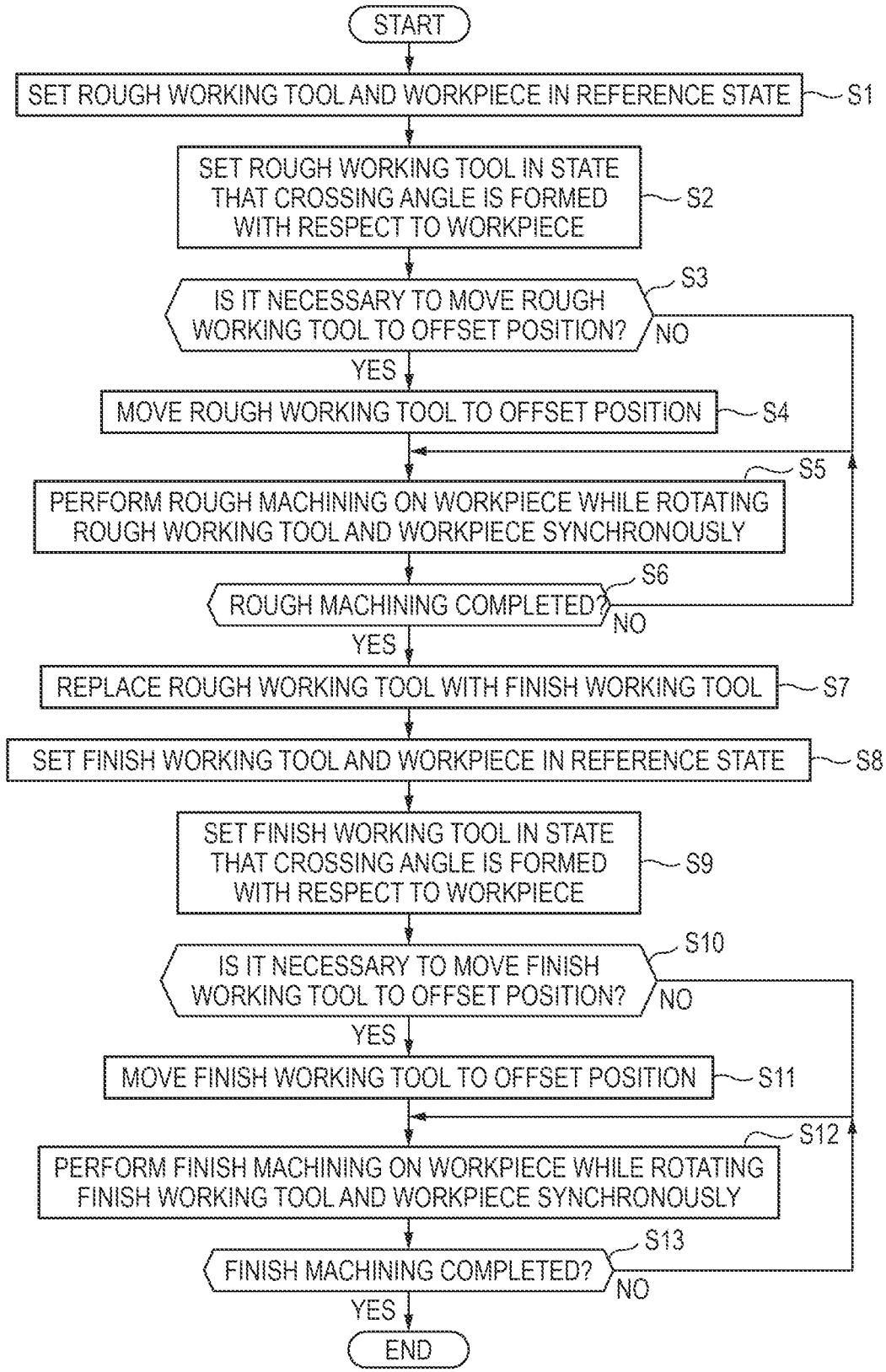
FIG. 7 is a flowchart for description of a gear machining method according to the embodiment of the present disclosure.

As shown in FIGS. 8A and 8B, at step S1 of a rough machining process, the control device 20 sets the first rough working tool 1A and the workpiece W in a reference state (a step of rough machining of S1 as shown in FIG. 7). Then, as shown in FIGS. 9A and 9B, at step S2, the control device 20 sets the first rough working tool 1A in a state that it forms a crossing angle θ with the workpiece W (a step of rough machining of S2 as shown in FIG. 7).

At step S3, the control device 20 judges whether it is necessary to move a machining point Pc of the first rough working tool 1A and the work W to an offset position (shown in FIG. 7). If it is not necessary to move the machining point Pc to an offset position, the control device 20 goes to step S5. In this example, each first rough working tool blade 3A of the first rough working tool 1A has no clearance angle and hence it is necessary to move the machining point Pc to an offset position. Thus, as shown in FIGS. 10A and 10B, at step S4, the control device 20 moves the machining point Pc of the first rough working tool 1A and the workpiece W to the offset position while maintaining the crossing angle θ (a step of rough machining of S4 as shown in FIG. 7).

At step S5, the control device 20 performs rough machining on the outer circumferential surface of the large-diameter cylindrical member of the workpiece W by feeding (moving) the first rough working tool 1A in the axial line Cw direction of the workpiece W while rotating the first rough working tool 1A and the workpiece W synchronously (a step of rough machining of S5 as shown in FIG. 7). At step S6, the control device 20 judges whether the rough machining on the outer circumferential surface of the large-diameter cylindrical member of the workpiece W has been completed. If the rough machining on the outer circumferential surface of the large-diameter cylindrical member of the workpiece W has not been completed yet, the control device 20 returns to step S5 (shown in FIG. 7).

On the other hand, if, at the step S6, the rough machining on the outer circumferential surface of the large-diameter cylindrical member of the workpiece W has been completed, at step S7 of a finish machining process, the control device 20 replaces the first rough working tool 1A with the first finish working tool 1C using the tool switching device 14 (a step of finish machining of S7 as shown in FIG. 7). Then, as shown in FIGS. 8A and 8B, at step S8, the control device 20 sets the first finish working tool 1C and the workpiece W in a reference state (a step of finish machining of S8 as shown in FIG. 7). Then, as shown in FIGS. 9A and 9B, at step S9, the control device 20 sets the first finish working tool 1C in a state that it forms a crossing angle θ with the workpiece W (a step of finish machining of S9 as shown in FIG. 7).

At step S10, the control device 20 judges whether it is necessary to move a machining point Pc of the first finish working tool 1C and the workpiece W to an offset position (a step of finish machining of S10 as shown in FIG. 7). If it is necessary to move the machining point Pc to an offset position, the control device 20 moves the machining point Pc to the offset position at step S11 (shown in FIG. 7). However, in this example, since each first finish working tool blade 3C of the first finish working tool 1C has clearance angles and hence it is not necessary to move the machining point Pc to an offset position. Thus, the control device 20 goes to step S12.

At step S12, the control device 20 performs finish machining on the teeth that are formed in the outer circumferential surface of the large-diameter cylindrical member of the workpiece W by feeding (moving) the first finish working tool 1C in the axial line Cw direction of the workpiece W while rotating the first finish working tool 1C and the workpiece W synchronously (a step of finish machining of S12 as shown in FIG. 7). At step S13, the control device 20 judges whether the finish machining on the teeth that are formed in the outer circumferential surface of the large-diameter cylindrical member of the workpiece W has been completed (shown in FIG. 7). If the finish machining on the teeth that are formed in the outer circumferential surface of the large-diameter cylindrical member of the workpiece W has not been completed yet, the control device 20 returns to step S12. On the other hand, if the finish machining on the teeth that are formed in the outer circumferential surface of the large-diameter cylindrical member of the workpiece W has been completed, the execution of the entire process is finished.

According to the above-described gear machining apparatus 10 and gear machining method, since the gear cutting tools 1A and 1B are used that have the replaceable tool blades 3A and 3B formed in a shape not based on the shape of the tooth surface of each gear tooth generated on the workpiece W, the tool blades can be formed in a simple shape compared with the tool blade 3C formed in a shape based on the shape of the tooth surface of each gear tooth generated on the workpiece W, so that the cost can be suppressed. Further, since the cost of tool replacement (replacement of the entire tool) is eliminated and the cost of only tool blade replacement (which may be replacement of some of the blades of the tool) is required, the gear machining cost can be reduced.

Moreover, while the workpiece W is such that the gear teeth are formed on the outer periphery of a cylindrical member, it may be such that the gear teeth are formed on the inner periphery of a cylindrical member. Since the machining processes (roles) can be shared and machining can be efficiently performed by performing rough machining (process) and finish machining (process) like the above-described embodiment, the machining processes (roles) for the tool cost can be optimally assigned (machining is performed with a comparatively costly high-precision working tool only in the highly precise machining process).

(4. Others)

Although the above-described embodiment is directed to the case that the first rough working tool 1A, the second rough working tool 1B, the first finish working tool 1C, and the second finish working tool 1D are tools for generating the gear teeth, they may be used as tools for chamfering tips of teeth or gear teeth of a spline mechanism or a synchromesh mechanism, or tools for machining a portion such as a missing tooth portion of a gear.

In the above embodiment, the gear machining apparatus 10 is configured in such a manner that the tool spindle 11 is movable in the X-axis direction and the Y-axis direction with respect to the workpiece spindle 12 and the workpiece spindle 12 is movable in the Z-axis direction with respect to the tool spindle 11. However, the gear machining apparatus 10 may be modified so that the tool spindle 11 and the workpiece spindle 12 can move relative to each other. Although in the embodiment the gear machining apparatus 10 is configured in such a manner that the workpiece spindle 12 is swingable (tiltable) about the A axis with respect to the tool spindle 11, the gear machining apparatus 10 may be modified so that the tool spindle 11 is swingable (tiltable) with respect to the workpiece spindle 12.

What is claimed is:

1. A gear machining apparatus configured to generate a gear tooth to a workpiece in which a finished shape of a tooth surface of the gear tooth includes an involute shape, the gear machining apparatus comprising:
    a rough working tool having
        a cylindrical rough working tool main body with an end surface including a plurality of triangular-prism shaped grooves circumferentially arranged on the end surface of the rough working tool main body, and
        a plurality of replaceable tool blades formed in a shape of a rhombus or an equilateral triangle, the plurality of replaceable tool blades being fitted in the plurality of grooves of the rough working tool main body and attached to the rough working tool main body, such that the plurality of replaceable tool blades are arranged in a circumferential direction of the rough working tool main body and a respective blade tip of each of the plurality of replaceable tool blades is oriented outward in a respective radial direction of the rough working tool main body;
    a finish working tool having
        a cylindrical finish working tool main body, and
        a plurality of tool blades provided to the finish working tool main body, such that the plurality of tool blades of the finish working tool are arranged in a circumferential direction of the finish working tool main body and a respective blade tip of each of the plurality of tool blades of the finish working tool are oriented outward in a respective radial direction of the finish working tool main body;
    a tool spindle which rotatably supports each of the rough working tool and the finish working tool;
    a workpiece spindle which rotatably supports the workpiece and which is movable relative to the tool spindle;
    a tool magazine which is capable of housing the rough working tool and the finish working tool;
    a tool changer which is configured to replace the rough working tool and the finish working tool with respect to the tool spindle;
    a rough machining controller which is configured to control the tool spindle and the workpiece spindle to perform a rough machining on the workpiece to perform a skiving operation to generate the gear tooth such that the gear tooth has an unfinished shape, such that the rough working tool is rotated about a center line that extends in an axial direction of the rough working tool, the workpiece is rotated about a center line that extends in an axial direction of the workpiece, and the workpiece spindle moves axially so that the workpiece is moved relative to the rough working tool along the center line that extends in the axial direction of the workpiece; and
    a finish machining controller which is configured to control the tool spindle and the workpiece spindle to perform a finish machining on the workpiece to generate the finished shape of the tooth surface of the gear tooth, such that the finish working tool is rotated about a center line that extends in an axial direction of the finish working tool, the workpiece is rotated about the center line that extends in the axial direction of the workpiece, and the workpiece spindle moves axially so that the workpiece is moved relative to the finish working tool along the center line that extends in the axial direction of the workpiece,
    wherein the rough working tool is a shape that cannot generate the involute shape by a skiving operation, and
    wherein the finish working tool is a shape that can generate the involute shape by a skiving operation.

2. The gear machining apparatus according to claim 1, wherein each of the plurality of replaceable tool blades of the rough working tool does not have a clearance angle, and
    wherein the rough machining controller is configured to control the tool spindle and the workpiece spindle to perform the rough machining on the workpiece with the rough working tool, such that the rough working tool has a crossing angle with respect to the workpiece, and a machining point between the rough working tool and the workpiece is located at a position that is offset from a reference position in a reference plane by an offset angle in a circumferential direction of the workpiece.

3. The gear machining apparatus according to claim 1, wherein each of the plurality of replaceable tool blades of the rough working tool has a clearance angle, and
    wherein the rough machining controller is configured to control the tool spindle and the workpiece spindle to perform the rough machining on the workpiece with the rough working tool, such that the rough working tool has a crossing angle with respect to the workpiece, and a machining point between the rough working tool and the workpiece is located at a reference position in a reference plane or is located at a position that is offset from the reference position in the reference plane by an offset angle in a circumferential direction of the workpiece.

4. The gear machining apparatus according to claim 1, wherein each of the tool blades of the finish working tool is replaceable, each of the tool blades of the finish working tool having a shape that is based on the finished shape of the tooth surface of the gear tooth and having a clearance angle, and
    wherein the finish machining controller is configured to control the tool spindle and the workpiece spindle to perform the finish machining on the workpiece, such that the finish working tool has a crossing angle with respect to the workpiece, and a machining point between the finish working tool and the workpiece is located at a reference position in a reference plane or is located at a position that is offset from the reference position in the reference plane by an offset angle in a circumferential direction of the workpiece.

5. The gear machining apparatus according to claim 1, wherein each of the tool blades of the finish working tool is integrally formed on the tool main body, each of the tool blades of the finish working tool having a shape that is based on the finished shape of the tooth surface of the gear tooth, and having a clearance angle, and wherein the finish machining controller is configured to control the tool spindle and the workpiece spindle to perform the finish machining on the workpiece, such that the finish working tool has a crossing angle with respect to the workpiece, and a machining point between the finish working tool and the workpiece is located at a reference position in a reference plane or is located at a position that is offset from the reference position in the reference plane by an offset angle in a circumferential direction of the workpiece.

6. The gear machining apparatus according to claim 1, wherein each of the tool blades of the rough working tool includes a respective lathe-cutting insert.

\* \* \* \* \*